United States Patent
Terao (10) Patent No.: US 10,547,468 B2
(45) Date of Patent: Jan. 28, 2020

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tsuyoshi Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 15/688,103

(22) Filed: Aug. 28, 2017

(65) Prior Publication Data

US 2018/0069718 A1    Mar. 8, 2018

(30) Foreign Application Priority Data

Sep. 2, 2016  (JP) .................. 2016-171652

(51) Int. Cl.
*H04L 12/28* (2006.01)
*H04W 84/12* (2009.01)
*H04W 76/10* (2018.01)
*H04L 29/06* (2006.01)
*H04W 48/08* (2009.01)

(52) U.S. Cl.
CPC ............ *H04L 12/28* (2013.01); *H04W 84/12* (2013.01); *H04L 63/0428* (2013.01); *H04L 63/10* (2013.01); *H04W 48/08* (2013.01); *H04W 76/10* (2018.02)

(58) Field of Classification Search
CPC .... H04L 12/128; H04W 84/12; H04W 48/08; H04W 12/12
See application file for complete search history.

(56) References Cited

U.S. PATENT DOCUMENTS

| | | | | |
|---|---|---|---|---|
| 2009/0029725 A1* | 1/2009 | Gerard Kindberg | ... | G06Q 30/02 455/466 |
| 2011/0151795 A1* | 6/2011 | D'Avello | ............... | H04K 3/226 455/63.3 |
| 2011/0312278 A1* | 12/2011 | Matsushita | ....... | H04L 12/40013 455/66.1 |
| 2014/0128095 A1* | 5/2014 | Finlow-Bates | ....... | H04W 4/021 455/456.1 |

FOREIGN PATENT DOCUMENTS

JP    2006-261938 A    9/2006

* cited by examiner

*Primary Examiner* — Anez C Ebrahim
(74) *Attorney, Agent, or Firm* — Canon U.S.A., Inc., IP Division (57) ABSTRACT

A communication apparatus includes a generation unit that generates an image including information about a frequency channel used for executing wireless communication and a communication unit that communicates with another communication apparatus that has read the generated image using the frequency channel included in the image. When the communication apparatus is connected to the wireless network, an image including information about a frequency channel used for the connected wireless network is generated, and when the communication apparatus is not connected to the wireless network, an image including information about a predetermined frequency channel is generated.

9 Claims, 5 Drawing Sheets

COMMUNICATION APPARATUS, COMMUNICATION METHOD, AND STORAGE MEDIUM

BACKGROUND

Field

The present disclosure relates to a communication technique.

Description of the Related Art

In recent years, there has been increased opportunities of using devices, such as a digital camera, a printer, a mobile phone and a smartphone, provided with a wireless communication function by connecting these devices to a wireless network. Particularly, there has been increased opportunities of executing inter-device communication by using a wireless local area network (LAN) as a wireless communication function.

In order to connect a device to a wireless network, various communication parameters, such as an encryption method, an encryption key, an authentication method, and an authentication key, which are necessary for executing wireless communication, have to be set to the device.

Japanese Patent Application Laid-Open No. 2006-261938 discusses a technique for enabling a device such as a digital camera to easily acquire information about an access point by using a function of reading a Quick Response (QR) Code®.

Information about a frequency channel used for executing wireless communication is included in a QR code, so that an apparatus that has read the QR code can easily start communicating with an apparatus that presents the QR code. This is because the apparatus that has read the QR code can just search a presented frequency channel for the apparatus instead of searching the entire frequency channels.

However, when the apparatus that presents the QR code has already connected to another wireless network, there is a possibility that the apparatus that has read the QR code cannot find the apparatus that presents the QR code. This is because a frequency channel used for the connected wireless network can be different from the frequency channel included in the QR code.

SUMMARY

The present disclosure is directed to a technique enabling an apparatus that provides information about a frequency channel and an apparatus that receives the provided information to start communicating with each other more easily even in a case where the apparatus that provides the information about the frequency channel has already connected to a wireless network.

According to an aspect of the present disclosure, a communication apparatus includes a determination unit configured to determine whether the communication apparatus is connected to a wireless network, a generation unit configured to generate an image including information about a frequency channel used for executing wireless communication, and a communication unit configured to communicate with another communication apparatus that has read the generated image using the frequency channel included in the image, wherein the generation unit generates an image including information about a frequency channel used for the connected wireless network in a case where the determination unit determines that the communication apparatus is connected to the wireless network, and generates an image including information about a predetermined frequency channel in a case where the determination unit determines that the communication apparatus is not connected to the wireless network.

Further features will become apparent from the following description of exemplary embodiments with reference to the attached drawings.

DESCRIPTION OF THE EMBODIMENTS

Figure 1:
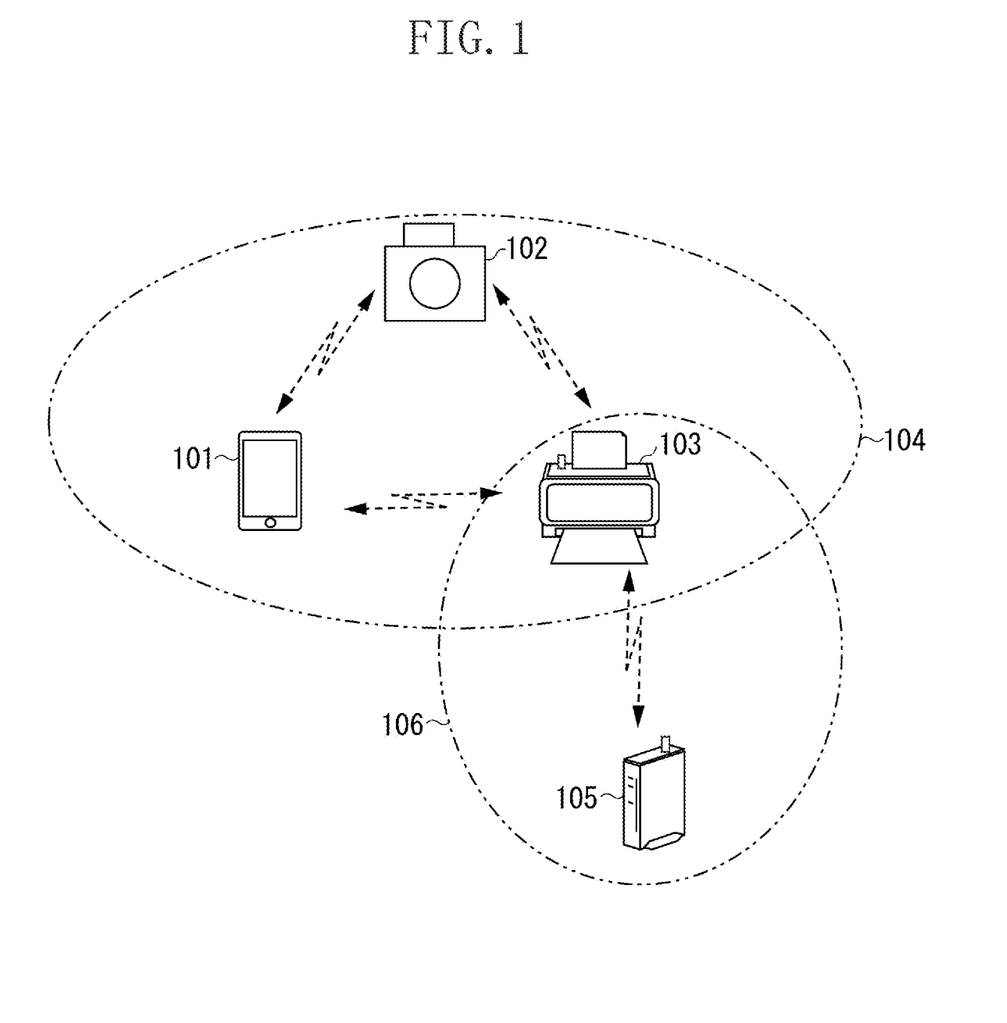
FIG. 1 is a diagram illustrating a configuration example of a communication system.

A configuration of a communication system as one example of an exemplary embodiment of the present invention is illustrated in FIG. 1. FIG. 1 is a diagram illustrating a smartphone 101, a camera 102, a printer 103, and an access point 105 (hereinafter, referred to as "AP 105") as a base station. A wireless network 106 is a first wireless network formed by the AP 105, and a wireless network 104 is a second wireless network formed by the camera 102 or the printer 103. In the present exemplary embodiment, the wireless networks 104 and 106 illustrated in FIG. 1 are wireless local area networks (LAN) compliant with the Institute of Electrical and Electronics Engineers (IEEE) 802.11 series. The smartphone 101, the camera 102, the printer 103, and the AP 105 are communication apparatuses including a wireless LAN function.

In the present exemplary embodiment, parameter setting processing for connecting the camera 102 and the printer 103 through a wireless LAN executed via the smartphone 101 will be described. The Wi-Fi device provisioning protocol (DPP) specified by the Wi-Fi Alliance® is used for the parameter setting processing. In the DPP, an apparatus operating as a configurator reads a QR code displayed on another apparatus, and uses a public key acquired from the read QR code to set a communication parameter to the other apparatus. The communication parameter includes various wireless communication parameters used for the wireless communication compliant with the IEEE 802.11 standard. For example, the communication parameter includes a service set identifier (SSID) as a network identifier, an encryption method, an encryption key, an authentication method, and an authentication key. The communication parameter can include an internet protocol (IP) address for executing communication in an IP layer.

In the present exemplary embodiment, the printer 103 operates as a station (hereinafter, referred to as "STA") of a wireless LAN, so as to be connected to the wireless network 106 formed by the AP 105. In this state, the smartphone 101 operates as a configurator of the DPP to execute setting of a communication parameter for establishing the wireless network 104 with respect to the printer 103. The printer 103 establishes the wireless network 104 based on the communication parameter acquired from the smartphone 101.

Subsequently, the smartphone 101 similarly executes setting processing of a communication parameter with respect to the camera 102. The camera 102 uses the communication parameter acquired from the smartphone 101 to connect to the wireless network 104 established by the printer 103. Eventually, the printer 103 can directly execute wireless communication with the camera 102 via the wireless network 104 while concurrently connecting to the wireless network 106 and communicating with the AP 105.

The smartphone 101, the printer 103, and the camera 102 in the communication system of the present exemplary embodiment are examples of the communication apparatuses, and can be replaced with other apparatuses, such as a video camera, various smart devices, and a personal computer (PC). A communication mode of the communication system in the present exemplary embodiment is not limited to the wireless LAN compliant with the IEEE 802.11.

Figure 2:
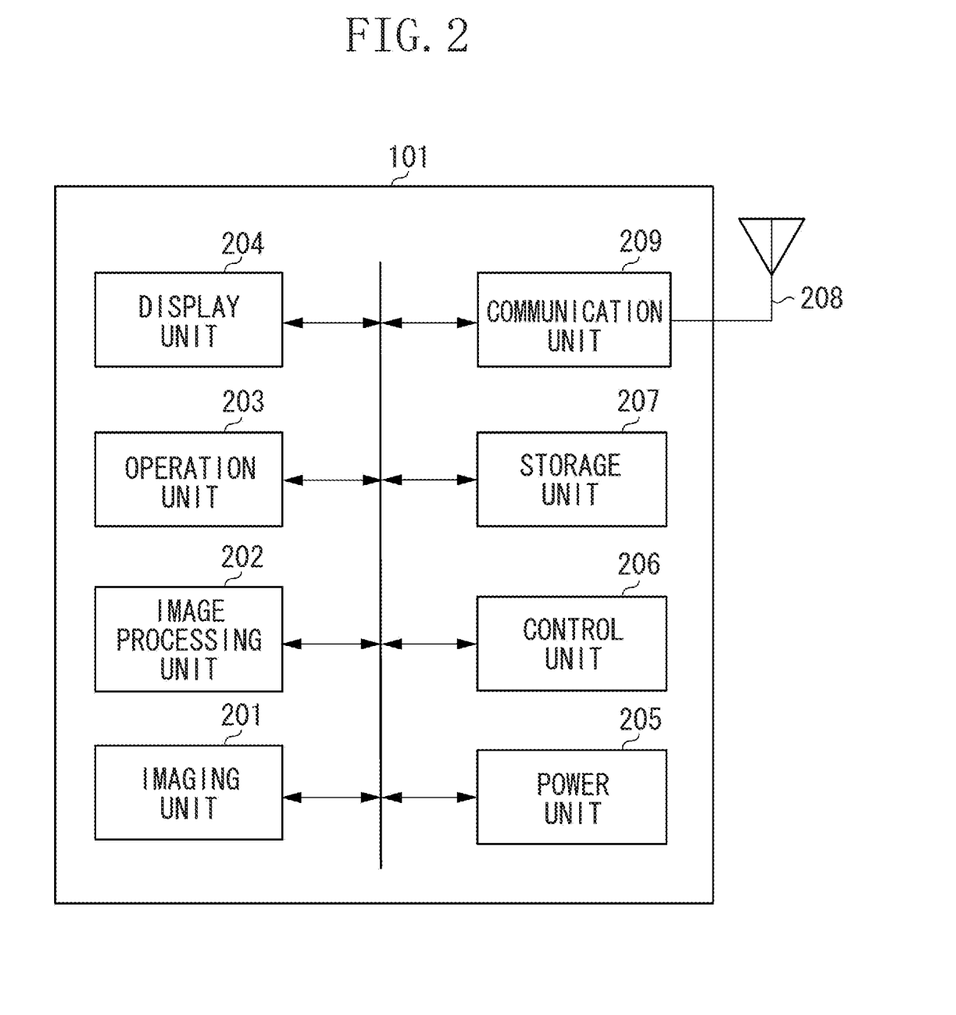
FIG. 2 is a block diagram illustrating a configuration of a smartphone.

A hardware configuration of the communication apparatus according to the present exemplary embodiment will be described with reference to FIG. 2. FIG. 2 is a block diagram illustrating a hardware configuration of the smartphone 101 operating as a configurator of the DPP. The smartphone 101 includes an imaging unit 201, an image processing unit 202, an operation unit 203, a display unit 204, a power unit 205, a control unit 206, a storage unit 207, an antenna 208, and a communication unit 209. The imaging unit 201 includes a charge coupled device (CCD) image sensor and a lens. The imaging unit 201 captures an image or a moving image. The imaging unit 201 captures and reads an image of a two-dimensional code, such as a QR code, or a one-dimensional barcode. The image processing unit 202 executes image processing of the image captured by the imaging unit 201. Decoding processing and analysis processing of the image, such as the below-described QR code, are executed by the image processing unit 202. The image processing unit 202 analyzes the image captured by the imaging unit 201, and decodes encoded information to acquire the decoded information.

The operation unit 203 includes an operation button for operating the smartphone 101. A flag corresponding to an input received through the operation unit 203 is stored in a memory such as the storage unit 207. The display unit 204 includes a function of outputting at least any of visual information and audio information. In a case where the display unit 204 displays the visual information, the display unit 204 includes a video RAM (VRAM) for storing image data corresponding to the visual information to be displayed. The display unit 204 executes display control of continuously displaying the image data stored in the VRAM on a liquid crystal display (LCD) or a light-emitting diode (LED) display. The power unit 205 supplies power to respective pieces of hardware of the smartphone 101. For example, the power unit 205 includes a battery.

The control unit 206 executes a control program stored in the storage unit 207 to generally control the smartphone 101. The control unit 206 executes the control program stored in the storage unit 207 to execute various operations described below. For example, the control unit 206 includes one or more central processing unit (CPU). The storage unit 207 stores the control program executed by the control unit 206 and various kinds of information, such as information about a communication partner apparatus. The storage unit 207 includes a storage medium, such as a hard disk drive (HDD), a flash memory, a removable secure digital (SD) card, a read only memory (ROM), or a random access memory (RAM).

The antenna 208 communicates at a 2.4 GHz band and/or a 5 GHz band for executing wireless LAN communication, and the communication unit 209 executes wireless LAN communication compliant with the IEEE 802.11 series. The communication unit 209 can execute protocol processing compliant with the Wi-Fi Direct. The communication unit 209 includes a chip for executing wireless communication.

A function stored in the storage unit 207 of the smartphone 101 as a program, which is realized by the control unit 206 by executing the program, will be described. The control unit 206 executes control of respective pieces of hardware and calculation or processing of information according to the control program, so as to realize the below-described function.

The smartphone 101 executes parameter setting processing for setting a communication parameter to a partner apparatus. In the parameter setting processing, a providing apparatus that provides a communication parameter provides the communication parameter for executing wireless communication to a receiving apparatus. In the present exemplary embodiment, while the smartphone 101 operates as the providing apparatus and the partner apparatus operates as the receiving apparatus will be described, the exemplary embodiment is not limited thereto. In a case where the partner apparatus includes the communication parameter, the smartphone 101 can acquire the communication parameter from the partner apparatus.

The parameter setting processing in the present exemplary embodiment will be described below. As described above, the DPP is used for the parameter setting processing in the present exemplary embodiment.

The smartphone 101 captures and reads a QR code displayed on or associated with another apparatus. Herein, the QR code associated with the other apparatus refers to a QR code generated by another apparatus and displayed or printed through a certain output method. Then, the smartphone 101 acquires information included in the read QR code necessary for setting the communication parameter. For example, the information necessary for setting the communication parameter can be information used for parameter setting processing or an encryption key for encrypting a message exchanged through the parameter setting processing. Information enabling the smartphone 101 to search for the apparatus that presents the QR code can be included. Information about a frequency channel of a wireless LAN is one example of the information used for searching. When the information about the frequency channel of the wireless LAN is included in the QR code, the smartphone 101 can simply search that frequency channel for the apparatus that presents the QR code, so that time taken for the search processing can be reduced.

For example, identification information for identifying the apparatus that presents the QR code can be included as one of the information used for searching. The identification information of the apparatus can be a media access control (MAC) address or a universally unique identifier (UUID) that uniquely identifies the apparatus. In a case where parameter setting according to the Wi-Fi Direct is to be executed, the identification information can be a peer-to-peer (P2P) device address or a P2P interface address.

In order to execute parameter setting processing with the partner apparatus based on the information acquired from the QR code, the smartphone 101 transmits a search signal to the partner apparatus and searches for the partner apparatus of the parameter setting processing.

In the present exemplary embodiment, the smartphone 101 executes authentication processing with the partner apparatus. Through the authentication processing, the smartphone 101 identifies whether the partner apparatus is a legitimate apparatus for executing the parameter setting processing. In the authentication processing, information included in the QR code can be used for authenticating the apparatus. Alternatively, a hash value of the information included in the QR code can be calculated and used as the authentication information. In the present exemplary embodiment, an encryption key that is subsequently used for encrypting and transmitting the communication parameter is shared between the smartphone 101 and a partner apparatus through the authentication processing.

In the present exemplary embodiment, while a search signal for executing the above-described parameter setting processing is described as an authentication request signal for the authentication processing, the exemplary embodiment is not limited to the above. For example, the signal for executing the parameter setting processing can be a search signal such as a Probe Request compliant with the IEEE 802.11 standard. An Action frame used for searching for a target communication apparatus can be used instead of the Probe Request.

A secure wireless link can be established between the smartphone 101 and the parameter apparatus, so that the authentication processing or the parameter setting processing can be executed through the established wireless link. Alternatively, the above-described processing can be executed using a predetermined frame, such as the Action frame of the wireless LAN. At this time, the Action frame itself can be encrypted. For example, an optional letter string for encryption can be set between the apparatuses, so that encryption is executed based on the information about the letter string.

After the smartphone 101 has detected the partner apparatus and succeeded in the authentication processing, the smartphone 101 encrypts the communication parameter and transmits the communication parameter to the partner apparatus through wireless communication. The communication parameter can be encrypted and transmitted using a public key. This public key can be included in the QR code. Herein, for example, the public key included in the QR code is a public key according to the elliptic curve Diffie-Hellman (ECDH) key exchange system. However, the public key is not limited to the above, and a public key according to another public key cryptosystem can also be used.

In addition, the smartphone 101 can register information about the partner apparatus for executing the parameter setting processing. The apparatus to be registered can be an apparatus that the smartphone 101 previously shared the communication parameter with. The apparatus to be registered can be an apparatus connectable via a secure link. Information acquired from the QR code can be registered as the information about the partner apparatus. Alternatively, information about a wireless network used at the last wireless communication with the partner apparatus can be registered as the information about the partner apparatus.

Figure 3:
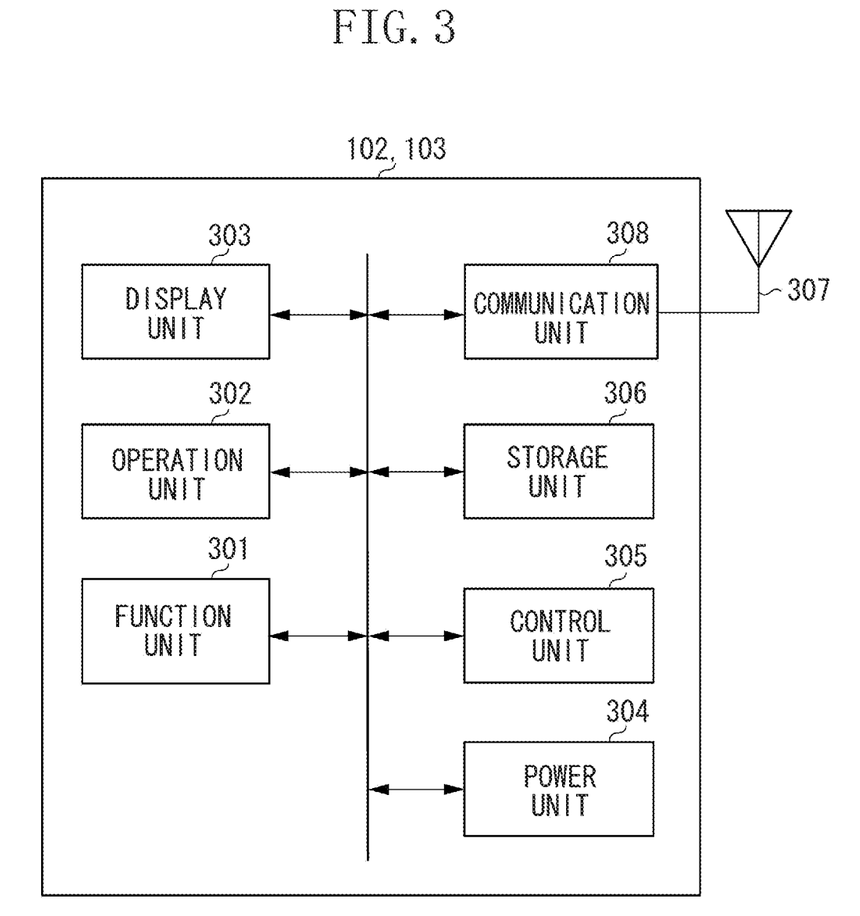
FIG. 3 is a block diagram illustrating a configuration of a camera or a printer.

A hardware configuration of the camera 102 or the printer 103 in the present exemplary embodiment will be described with reference to FIG. 3. The camera 102 or the printer 103 includes a function unit 301, an operation unit 302, a display unit 303, a power unit 304, a control unit 305, a storage unit 306, an antenna 307, and a communication unit 308. In FIG. 3, the function unit 301 of the camera 102 serves as an imaging unit for executing imaging processing and image storing processing. The function unit 301 includes hardware for executing the functions of the function unit 301. As for the printer 103, the function unit 301 serves as a printing unit for executing printing processing. The operation unit 302 includes an operation button for operating the camera 102 or the printer 103. A flag corresponding to an input received through the operation unit 302 is stored in a memory, such as the storage unit 306. The display unit 303 includes a function of outputting at least any of visual information and audio information. In a case where the display unit 303 displays the visual information, the display unit 303 includes a VRAM for storing image data corresponding to the visual information to be displayed. The display unit 303 executes display control of continuously displaying the image data stored in the VRAM on an LCD or an LED display. The power unit 304 supplies power to respective pieces of hardware of the camera 102 or the printer 103. For example, the power unit 304 includes a battery or an alternating-current (AC) adapter.

The control unit 305 executes a control program stored in the storage unit 306 to generally control the camera 102 or the printer 103. The control unit 305 executes the control program stored in the storage unit 306 to execute various operations described below. For example, the control unit 305 includes one CPU or more. The storage unit 306 stores the control program executed by the control unit 305 and various kinds of information, such as information about a communication partner apparatus. The storage unit 306 includes a storage medium such as an HDD, a flash memory, a removable SD card, a ROM, or a RAM.

The antenna 307 communicates at a 2.4 GHz band and/or a 5 GHz band for executing wireless LAN communication, and the communication unit 308 executes wireless LAN communication compliant with the IEEE 802.11 series. The communication unit 308 includes a chip for executing wireless communication.

A function stored in the storage unit 306 of the camera 102 or the printer 103 as a program, which is realized by the control unit 305 by executing the program, will be described. The control unit 305 executes control of respective pieces of hardware and calculation or processing of information according to the control program, so as to realize the below-described function.

The camera 102 and the printer 103 can execute parameter setting processing for sharing the communication parameter between the camera 102 and the printer 103. The camera 102 operates as an access point (AP) and/or a station (STA) specified by the IEEE 802.11 standard when communication is executed by the communication unit 308. The printer 103 also operates as an AP and/or an STA specified by the IEEE 802.11 standard when communication is executed by the communication unit 308. The AP and the STA in the present exemplary embodiment include respectively a Group Owner and a Client specified in the Wi-Fi Direct standard.

The communication unit 308 can connect to a plurality of networks at a same frequency channel. For example, the communication unit 308 can concurrently operate as an STA to participate in a wireless network formed by another AP at the same frequency channel while operating as an AP to form a wireless network. The communication unit 308 can wait for various messages for the parameter setting processing at the same frequency channel while operating as an AP or an STA.

The camera 102 and the printer 103 can respectively generate a QR code including information necessary for the communication parameter setting. The generated QR code is displayed on the LCD by the display unit 303. Alternatively, the QR code is printed and output through printing processing executed by the function unit 301.

The information necessary for the communication parameter setting is, for example, information used for protocol processing of the parameter setting processing. The other pieces of information necessary for the communication parameter setting are similar to those of the smartphone 101 described above, and thus description thereof will be omitted.

In the present exemplary embodiment, the camera 102 and the printer 103 can dynamically generate and display a QR code on the display unit 303. The camera 102 and the printer 103 receive a start instruction of the parameter setting processing to display an encrypted QR code, including a MAC address. Similarly, the camera 102 and the printer 103 receive a start instruction of the parameter setting processing to wait for an authentication request of the parameter setting processing to be received at a fixed frequency channel. The information about the frequency channel is also encrypted and included in the QR code generated by the camera 102 and the printer 103.

An operation of a communication system with the above-described configuration will be described. Herein, the respective parameter setting processing of the camera 102 and the printer 103 executed using the smartphone 101 in order to make the camera 102 and the printer 103 communicate through the wireless LAN will be described.

Figure 4:
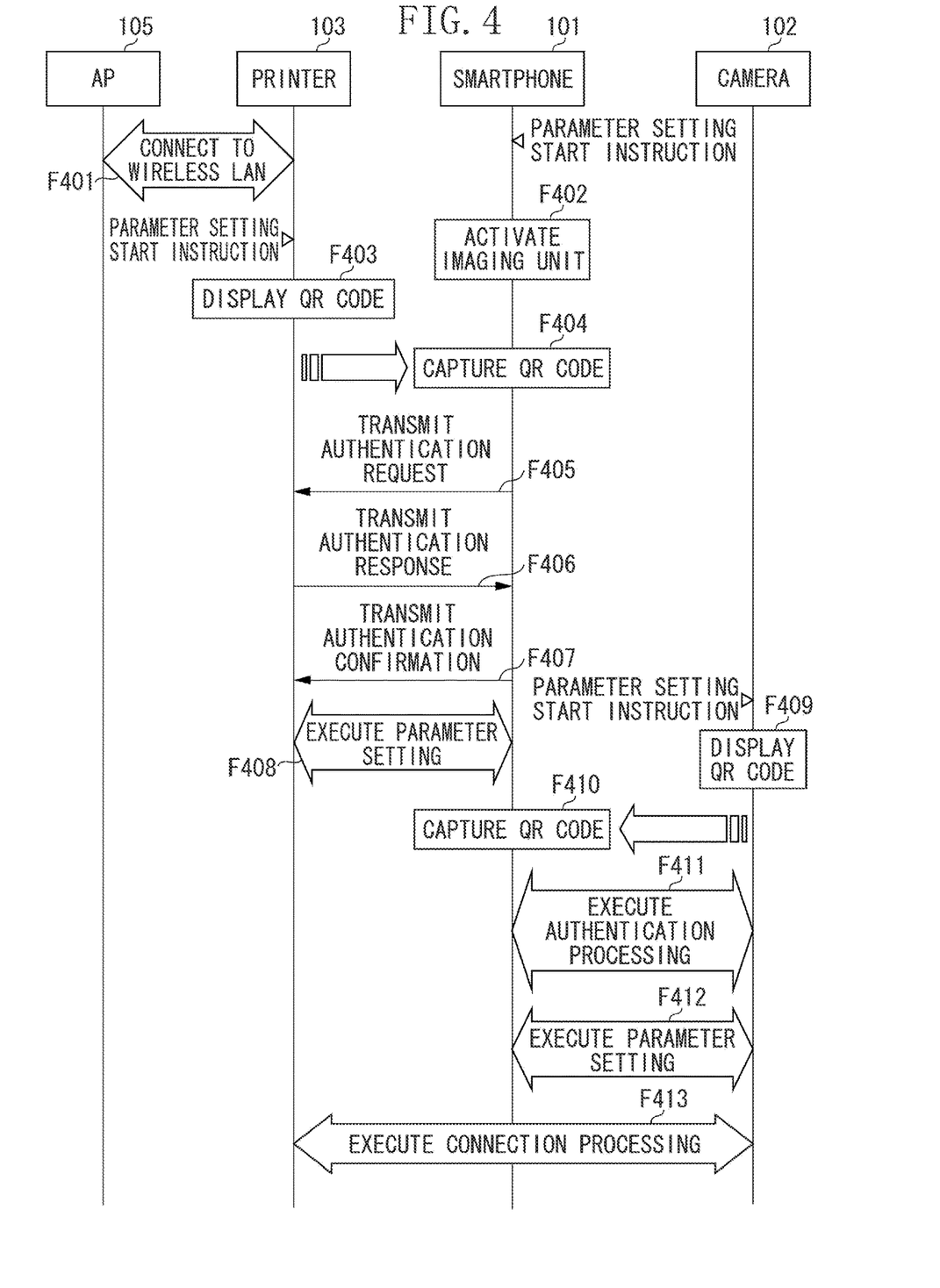
FIG. 4 is a diagram illustrating an operation sequence of the communication system.

FIG. 4 is a sequence chart of the communication system in the present exemplary embodiment. In the sequence chart in FIG. 4, an operation of connecting the camera 102 and the printer 103 through the wireless LAN using the smartphone 101 is illustrated. In step F401 in FIG. 4, the printer 103 previously participated in another wireless network 106 formed by the AP 105 as an STA to execute communication. The smartphone 101 captures a QR code of the printer 103 and executes parameter setting processing with the printer 103. The printer 103 uses the communication parameter acquired from the smartphone 101 and establishes the wireless network 104. Subsequently, the smartphone 101 captures a QR code of the camera 102 and makes the camera 102 connect to the wireless network 104.

The smartphone 101 receives a start instruction of the parameter setting processing. For example, the user operates a predetermined button of the smartphone 101 to provide the start instruction of the parameter setting processing. When the start instruction of the parameter setting is provided, in step F402, the smartphone 101 activates the imaging unit 201 to capture the QR code. At this time, for example, a message such as "Please make a printer display a QR code and capture the image" can be displayed on the display unit 204 of the smartphone 101. Then, the printer 103 receives the start instruction of parameter setting. For example, the user operates a predetermined button of the printer 103 to provide the start instruction of the parameter setting processing. When the printer 103 receives the start instruction of the parameter setting, in step F403, the printer 103 displays an encrypted QR code including the information about a frequency channel used for the parameter setting processing on the display unit 303 through the processing in FIG. 5 described below. At this time, because the printer 103 is communicating through the wireless network 106 formed by the AP 105, a value the same as a value of the frequency channel used for the wireless network 106 is set as the frequency channel used for the parameter setting processing included in the QR code. For example, when a channel-1 (1ch) of a 2.4 GHz band is used for the wireless network 106, the printer 103 generates and displays a QR code including the information indicating "1ch".

The printer 103 waits for an authentication request from a partner apparatus to be received at the frequency channel used for the parameter setting processing. Then, in step F404, the smartphone 101 captures the QR code displayed on the display unit 303 of the printer 103.

After capturing the QR code, in step F405, the smartphone 101 transmits an authentication request to the printer 103 based on the information included in the QR code. Herein, the smartphone 101 transmits the authentication request through a channel used for the parameter setting processing included in the QR code. Because the printer 103 waits for the authentication request to be received at that frequency channel, the printer 103 can instantly receive the authentication request transmitted thereto.

As described above, information relating to the information included in the QR code is transmitted together with the authentication request. Upon receipt of the authentication request, the printer 103 compares, in step F406, the information included in the authentication request with the information included in the QR code it displayed to execute authentication processing, and transmits the authentication result to the smartphone 101 as an authentication response.

The smartphone 101 receives the authentication response transmitted from the printer 103 and analyzes the authentication result. In a case where the authentication is successful after the analysis, in step F407, the smartphone 101 transmits an authentication confirmation indicating completion of the authentication to the printer 103. In addition, information about an encryption key used for encrypting the communication parameter can be included and transmitted together with the authentication confirmation.

After the authentication processing, in step F408, parameter setting processing is executed by the smartphone 101 and the printer 103, and the communication parameter is transferred to the printer 103 from the smartphone 101. In the parameter setting processing, encrypted communication is executed by the smartphone 101 and the printer 103 based on the encryption key shared in the authentication processing.

In the present exemplary embodiment, it is assumed that the authentication request, the authentication response, and the parameter setting processing are executed using the Action frame defined by the IEEE 802.11 standard. It is assumed that the printer 103 can also support transmission and reception of the Action frame.

After the parameter setting processing is completed by the printer 103, the printer 103 forms the wireless network 104 using the communication parameter transferred from the smartphone 101. Because the printer 103 is connected to the wireless network 106, the wireless network 104 is formed at a frequency channel the same as that of the wireless network 106. In a case where the printer 103 previously formed a wireless network with another communication parameter, the printer 103 forms a wireless network again using the transferred communication parameter.

Subsequently, a start instruction of the parameter setting processing is made in the camera 102. For example, the user operates a predetermined button of the camera 102 to provide the start instruction of the parameter setting processing. When the start instruction of the parameter setting is made in the camera 102, in step F409, the camera 102 displays an encrypted QR code including the information about a frequency channel used for the parameter setting processing on the display unit 303 through the processing in FIG. 5 described below. Then, the camera 102 waits for an authentication request from a partner apparatus to be received at the frequency channel used for the parameter setting processing.

In step F410, the smartphone 101 captures the QR code displayed on the display unit 303 of the camera 102. After ending the parameter setting processing with the printer 103, the smartphone 101 can be brought into a state where the smartphone 101 automatically captures the QR code, or a state where the smartphone 101 captures the QR code by receiving the start instruction of the parameter setting again. After capturing both the QR codes of the printer 103 and the camera 102, the smartphone 101 can execute authentication and parameter setting with the printer 103 and then with the camera 102, respectively. In this case, the smartphone 101 can sequentially display messages such as "Please capture a QR code of the printer" and "Please capture a QR code of the camera" on the display unit 204 thereof to guide the user. After capturing the QR code, in step F411, the smartphone 101 transmits an authentication request to the camera 102 based on the information included in the QR code to start the authentication processing similar to the authentication processing executed in steps F405 to F407. Herein, the smartphone 101 transmits the authentication request through a frequency channel included in the QR code used for the parameter setting processing. Because the camera 102 waits for the authentication request to be received at the frequency channel, the camera 102 can instantly receive the authentication request transmitted thereto. The authentication request and the authentication confirmation are similar to those described in steps F406 and F407, thus, description thereof will be omitted.

After the authentication processing, in step F412, parameter setting processing is executed by the smartphone 101 and the camera 102, and the communication parameter is transferred to the camera 102 from the smartphone 101. In the parameter setting processing, encrypted communication is executed between the smartphone 101 and the camera 102 based on the encryption key shared in the authentication processing. Herein, the communication parameter of the wireless network 104 established by the printer 103 is transferred thereto.

After the parameter setting processing is completed by the camera 102, in step F413, the camera 102 uses the communication parameter transferred from the smartphone 101 to connect to the wireless network 104 through the wireless LAN. In order to reduce the time taken for the camera 102 to search for the printer 103, when the communication parameter is transferred from the smartphone 101 to the camera 102, information enabling the camera 102 to specify the printer 103 can be included and transmitted together with the communication parameter. The information enabling the camera 102 to specify the printer 103 can be a MAC address of the printer 103, frequency channel information of the wireless network 104, or an operating frequency range (i.e., information indicating a 2.4 GHz band or a 5 GHz band).

Alternatively, information enabling the camera 102 and the printer 103 to specify each other can be included and transmitted together with the communication parameter. The information enabling the camera 102 and the printer 103 to specify each other can be public keys thereof included in respective QR codes, information generated from the public keys, or information relating to the public keys.

Through the above-described sequence, while the printer 103 maintains connection to the wireless network 106, the printer 103 can communicate with the smartphone 101 through a wireless network different from the wireless network 106 at a frequency channel the same as that of the wireless network 106. The camera 102 can connect to the printer 103 through the wireless network 104 formed by the printer 103. With this configuration, the printer 103 can communicate with the camera 102 through the wireless network 104 different from the wireless network 106 at the frequency channel the same as that of the wireless network 106 while maintaining connection to the wireless network 106.

Figure 5:
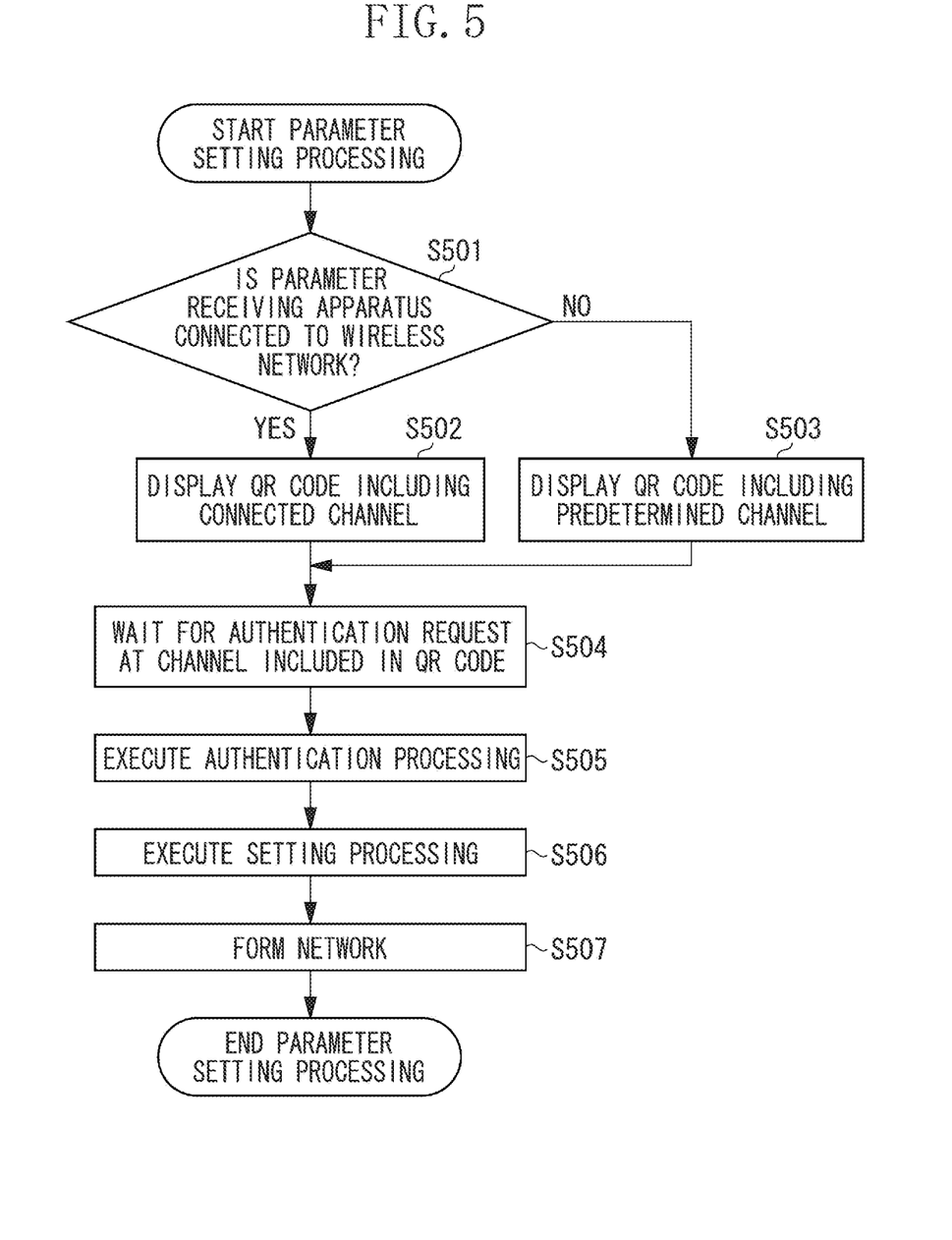
FIG. 5 is a flowchart illustrating an operation of the camera or the printer.

FIG. 5 is a flowchart illustrating parameter setting processing executed by the camera 102 or the printer 103. The flowchart in FIG. 5 starts when the user provides a start instruction of the parameter setting processing via the operation unit 203. In the following description, the camera 102 or the printer 103 is generally referred to as a parameter receiving apparatus that receives a communication parameter.

The flowchart in FIG. 5 illustrates a flow of processing which the control unit 305 executes by reading and executing a computer program stored in the storage unit 306. All or a part of the steps illustrated in the flowchart in FIG. 5 can be realized with hardware, such as an application specific integrated circuit (ASIC).

The flowchart of parameter setting processing executed by the parameter receiving apparatus will be described with reference to FIG. 5. In step S501, the parameter receiving apparatus receives a start instruction of the parameter setting processing and determines whether the parameter receiving apparatus is connected to another wireless network through the communication unit 308. For example, it is determined that the parameter receiving apparatus is in a connected state when the communication unit 308 is connecting to a wireless network formed by another AP. It is also determined that the parameter receiving apparatus is in a connected state when the communication unit 308 is operating as an AP and forming a wireless network. Alternatively, it is determined that the parameter receiving apparatus is in a connected state when the parameter receiving apparatus is waiting for a Go-Negotiation-Request at a specific frequency channel based on the Wi-Fi Direct standard.

In a case where it is determined that the parameter receiving apparatus is connected to the wireless network (YES in step S501), the processing proceeds to step S502. In step S502, the parameter receiving apparatus generates a QR code including a frequency channel the same as the frequency channel used for the connected wireless network as information about a frequency channel used for parameter setting. For example, when the communication unit 308 is connecting to a wireless network formed by another AP, the information about the frequency channel to be included in the QR code is information about a frequency channel of the wireless network formed by another AP. When the parameter receiving apparatus itself makes the communication unit 308 operate as an AP to form a wireless network, the information about the frequency channel to be included in the QR code is information about a frequency channel of the wireless network formed by the parameter receiving apparatus itself. Alternatively, when the parameter receiving apparatus is waiting for the Go-Negotiation-Request at a specific frequency channel based on the Wi-Fi Direct standard, the channel to be included in the QR code is a Listen-Channel.

In a case where it is determined that the parameter receiving apparatus is not connected to the wireless network (NO in step S501), the processing proceeds to step S503. In step S503, the parameter receiving apparatus generates a QR code including a predetermined frequency channel as a frequency channel used for the parameter setting processing. For example, the predetermined frequency channel can be a frequency channel randomly selected from all of frequency channels usable by the communication unit 308. The predetermined frequency channel can be a frequency channel randomly selected from a plurality of combinations of frequency channels, such as 1ch, 6ch, and 11ch, previously stored in the storage unit 306. The predetermined frequency channel can be a specific frequency channel previously stored in the storage unit 306. Alternatively, the predetermined frequency channel can be a frequency channel with an empty space selected by scanning all of the usable frequency channels.

Information used for parameter setting is included in the QR code generated in step S502 or S503 in addition to the frequency channel used for the parameter setting processing. For example, a public key of the parameter receiving apparatus can be included. Alternatively, a MAC address can be included as the identification information of the parameter receiving apparatus.

Information to be displayed on a user interface of an apparatus that captures the QR code can be included in the QR code generated in step S502 or S503. For example, a device type category, a device name, a nickname, or a manufacturer's name of the parameter receiving apparatus can be included.

After displaying the QR code, in step S504, the parameter receiving apparatus waits for an authentication request at the frequency channel used for the parameter setting processing included in the QR code. Even if it is determined that the parameter receiving apparatus is connected to the wireless network in step S501, the parameter setting processing can be executed without disconnection of the current connection, because the parameter receiving apparatus waits for the authentication request at a frequency channel the same as the frequency channel used for that wireless network. This authentication request corresponds to a DPP Authentication Request frame specified by the DPP standard. The authentication request includes authentication information used for the authentication and identification information of the apparatus that transmits the authentication request. For example, the authentication information used for the authentication can be a hash value of the public key included in the QR code. The identification information of the apparatus that transmits the authentication request can be a public key of the apparatus that transmits the authentication request or the public key thereof encrypted with a public key included in the QR code. Information to be displayed on the display unit 303 of the parameter receiving apparatus can be included in the authentication request. For example, a device type category, a device name, a nickname, or a manufacturer's name of the apparatus that transmits the authentication request can be included. The parameter receiving apparatus can display all or a part of the information included in the authentication request received in step S504.

In addition, in step S504, in a case where the authentication request cannot be received within a predetermined time period, the parameter receiving apparatus can stop waiting for the authentication request. In a case where the authentication request cannot be received within a predetermined time period, the parameter receiving apparatus can display an error message on the display unit 303 to notify the user about an error.

In step S505, the parameter receiving apparatus executes authentication processing based on the authentication request received in step S504. For example, the parameter receiving apparatus verifies the authentication information used for the authentication included in the authentication request, and transmits the authentication response if the apparatus that transmits the authentication request can be determined as the apparatus that captures the QR code. This authentication response corresponds to a DPP Authentication Response frame specified by the DPP standard. The parameter receiving apparatus can calculate a hash value of the public key included in the QR code and compare the calculated hash value with the hash value included in the authentication request to determine that the above verification is successful when both of the hash values conform to each other. It is assumed that a hash function used for calculating the hash value is previously agreed between the parameter receiving apparatus and the apparatus that transmits the authentication request.

In step S505, the parameter receiving apparatus uses the information included in the received authentication request to generate a shared key shared with the apparatus that transmits the authentication request. For example, information generated by using both a private key paired with the public key included in the QR code and the public key of the apparatus that transmits the authentication request included in the authentication request can be used as the shared key. At this time, the shared key can be generated based on the ECDH method.

The parameter receiving apparatus transmits the information encrypted with the generated shared key together with the authentication response. After transmitting the authentication response, the parameter receiving apparatus waits for an authentication confirmation to be transmitted from the apparatus that transmits the authentication request. This authentication confirmation corresponds to a DPP Authentication Confirm frame specified by the DPP standard.

This authentication confirmation can include authentication information that is encrypted with a shared key generated by the apparatus that transmits the authentication request through a method the same as a method through which the parameter receiving apparatus generates the shared key. The parameter receiving apparatus can determine that the authentication is successful when the authentication information can be correctly decrypted with the shared key generated by the parameter receiving apparatus itself.

In a case where the authentication is unsuccessful in step S505, the parameter receiving apparatus can end the parameter setting processing. When the authentication is unsuccessful, the parameter receiving apparatus can display an error message on the display unit 303 to notify the user about an error.

When the authentication is completed in step S505, in step S506, the parameter receiving apparatus executes communication parameter setting processing. In step S506, the parameter receiving apparatus approves the apparatus that transmits the authentication request as a parameter providing apparatus, and transmits a setting request to the parameter providing apparatus. This setting request corresponds to a DPP Configuration Request frame specified by the DPP standard. The setting request includes information relating to parameters to be requested, which is encrypted with the shared key generated in step S505. For example, a role of the parameter receiving apparatus in the formed wireless network can be included. Herein, the role of the parameter receiving apparatus to be included is a role desired by the parameter receiving apparatus. After transmitting the setting request, the parameter receiving apparatus waits for a setting response to be transmitted from the parameter providing apparatus. This setting response corresponds to a DPP Configuration Response frame specified by the DPP standard. For example, the setting response transmitted by the parameter providing apparatus includes an identifier of the wireless network, a role of the parameter receiving apparatus in the wireless network, an encryption key for connecting to the wireless network, a name of the wireless network, and an effective period of the communication parameter. Herein, an identifier indicating an AP or an STA can be included as the information about the role of the parameter receiving apparatus in the wireless network. Alternatively, an identifier indicating any of a Group Owner and a Client in the Wi-Fi Direct can be included as the information about the role thereof. An SSID can be included in the setting response as the information about a name of the wireless network. The setting information included in the setting response can be encrypted with the shared key generated by the authentication processing.

After the setting processing is completed in step S506, in step S507, the parameter receiving apparatus connects to the wireless network based on the setting information received in step S506. For example, when the role of the parameter receiving apparatus included in the setting information is an AP, the parameter receiving apparatus makes the communication unit 308 operate as an AP to form a wireless network. The SSID included in the setting information can be used as an SSID of the wireless network to be formed. In a case where it is determined that the parameter receiving apparatus is connected to the wireless network in step S501, a frequency channel the same as the frequency channel of the connected wireless network is used as the frequency channel of the wireless network to be formed. When the role of the parameter receiving apparatus included in the setting information is an STA, the parameter receiving apparatus makes the communication unit 308 operate as an STA. Then, the parameter receiving apparatus searches for the wireless network using the SSID included in the setting information, and connects to the found wireless network using the communication parameter included in the setting information.

According to the present exemplary embodiment, even if the apparatus that provides the information about the frequency channel together with the QR code previously connected to another wireless network, the apparatus can easily start communicating with the apparatus that has read the QR code while maintaining the communication executed through the other wireless network. The apparatus can concurrently, with the communication executed through the connected wireless network, communicate with the apparatus that has read the QR code through a wireless network different from the connected wireless network.

In the above-described exemplary embodiment, although processing using the DPP has been described as an example of the parameter setting processing, the parameter setting processing can be executed by another method. For example, the apparatus that presents the QR code can present a communication parameter of the wireless network together with the QR code. Then, information about the frequency channel of the wireless network can be included in that QR code in addition to the communication parameter. In this case, the apparatus that has read the QR code connects to a wireless network using the frequency channel and the communication parameter acquired from the read QR code. With this configuration, even if the apparatus that presents the QR code previously connected to one wireless network, the apparatus can easily and concurrently start communicating with another apparatus through another wireless network while maintaining the connection of the one wireless network.

In the above-described exemplary embodiment, the QR code to be read is not limited to the QR code displayed on the display unit. For example, the camera 102 or the printer 103 can include a web server function to display the QR code on a web page. A one-dimensional barcode or a two-dimensional code other than the QR code can be used. Information in a format readable by the user can be used instead of machine-readable information such as the QR code.

In the above-described exemplary embodiment, although the apparatuses communicate with each other through the wireless LAN communication compliant with the IEEE 802.11 standard, an exemplary embodiment is not limited thereto. For example, the apparatuses can execute communication through a wireless communication medium such as a wireless universal serial bus (USB), the Multi-Band OFDM Alliance (MBOA), Bluetooth®, an ultrawideband (UWB), ZigBee, or a near field communication (NFC). The UWB includes a wireless USB, a wireless 1394, and the WiNet.

In the above-described exemplary embodiment, although the camera 102 and the printer 103 are connected to each other through an infrastructure mode of the wireless LAN, the exemplary embodiment is not limited thereto. For example, the present invention is also applicable to a case where the camera 102 and the printer 103 are connected to each other through an ad-hoc mode of the wireless LAN. When the camera 102 and the printer 103 include a connection function of the Wi-Fi Direct, the present invention can also be applicable to a case where the camera 102 and the printer 103 are connected to each other through the Wi-Fi Direct. In this case, after completion of the communication parameter setting processing, either the camera 102 or the printer 103 operates as a Group Owner in the Wi-Fi Direct to establish a wireless network using the shared communication parameter. Then, either the camera 102 or the printer 103 that is not operating as the Group Owner connects to the Group Owner as a Client in the Wi-Fi Direct, so that connection through the Wi-Fi Direct can be executed.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-171652, filed Sep. 2, 2016, which is hereby incorporated by reference herein in its entirety.

What is claimed is:

1. A communication apparatus comprising:
one or more processors; and
one or more memories including instructions that, when executed by the one or more processors, cause the apparatus to:
display a code image including information for starting communication compliant with a Wi-Fi Device Provisioning Protocol (DPP) standard for communicating a communication parameter for a second wireless network different from a first wireless network with another communication apparatus, the information comprising information of a first frequency channel that is same as a frequency channel of the first wireless network, in a case where the communication apparatus is in the first wireless network; and
communicate the communication parameter with the other communication apparatus by performing the communication compliant with the Wi-Fi DPP standard in the first frequency channel in a case where the other communication apparatus has read the displayed code image.

2. The communication apparatus according to claim 1, wherein the communication apparatus generates an image including information about a second frequency channel in a case where the communication apparatus is not connected to the first wireless network.

3. The communication apparatus according to claim 1, wherein the communication apparatus concurrently executes communication in the first communication network and communication in the second wireless network.

4. The communication apparatus according to claim 1, wherein the communication apparatus forms a wireless network using the communication parameter set by the communication parameter setting processing.

5. The communication apparatus according to claim 1, wherein the image is any of a barcode and a two-dimensional code.

6. The communication apparatus according to claim 2, wherein the second frequency channel is a specific frequency channel previously stored or a randomly selected frequency channel.

7. The communication apparatus according to claim 1, wherein the communication apparatus determines whether the communication apparatus is connected to the first wireless network.

8. A communication method comprising:
displaying a code image including information for starting communication compliant with a Wi-Fi Device Provisioning Protocol (DPP) standard for communicating a communication parameter for a second wireless network different from a first wireless network with another communication apparatus, the information comprising information of a first frequency channel that is same as a frequency channel of the first wireless network, in a case where the communication apparatus is in the first wireless network; and
communicating the communication parameter with the other communication apparatus by performing the communication compliant with the Wi-Fi DPP standard in the first frequency channel in a case where the other communication apparatus has read the displayed code image.

9. A non-transitory computer-readable storage medium storing a program which causes a communication apparatus to execute a method, the method comprising:
displaying a code image including information for starting communication compliant with a Wi-Fi Device Provisioning Protocol (DPP) standard for communicating a communication parameter for a second wireless network different from a first wireless network with another communication apparatus, the information comprising information of a first frequency channel that is same as a frequency channel of the first wireless network, in a case where the communication apparatus is in the first wireless network; and
communicating the communication parameter with the other communication apparatus by performing the communication compliant with the Wi-Fi DPP standard in the first frequency channel in a case where the other communication apparatus has read the displayed code image.

* * * * *